United States Patent
Rofougaran et al.

(10) Patent No.: US 8,438,322 B2
(45) Date of Patent: May 7, 2013

(54) PROCESSING MODULE WITH MILLIMETER WAVE TRANSCEIVER INTERCONNECTION

(75) Inventors: Ahmadreza (Reza) Rofougaran, Newport Coast, CA (US); Timothy W. Markison, Lahaina, HI (US)

(73) Assignee: Broadcom Corporation, Irvine, CA (US)

( * ) Notice: Subject to any disclaimer, the term of this patent is extended or adjusted under 35 U.S.C. 154(b) by 1194 days.

(21) Appl. No.: 12/202,256

(22) Filed: Aug. 30, 2008

(65) Prior Publication Data

US 2008/0320281 A1    Dec. 25, 2008

Related U.S. Application Data

(63) Continuation-in-part of application No. 12/026,681, filed on Feb. 6, 2008, now abandoned, and a continuation-in-part of application No. 11/700,285, filed on Jan. 31, 2007, now Pat. No. 8,116,294.

(51) Int. Cl.
*G06F 9/00* (2006.01)

(52) U.S. Cl.
USPC ............................................ 710/107; 712/22

(58) Field of Classification Search .................. 710/107; 712/22
See application file for complete search history.

(56) References Cited

U.S. PATENT DOCUMENTS

| 4,807,183 | A | 2/1989 | Kung |
| 5,502,683 | A | 3/1996 | Marchioro |
| 5,754,948 | A * | 5/1998 | Metze .................. 455/41.2 |
| 5,786,912 | A | 7/1998 | Kartalopoulos |
| 5,809,321 | A | 9/1998 | Hansen |
| 5,884,104 | A | 3/1999 | Chase |
| 6,182,203 | B1 | 1/2001 | Simar |
| 6,234,900 | B1 | 5/2001 | Cumbers |
| 6,438,622 | B1 | 8/2002 | Haghighi et al. |
| 6,500,070 | B1 | 12/2002 | Tomizawa et al. |
| 6,663,295 | B2 | 12/2003 | Kami et al. |
| 6,735,663 | B2 | 5/2004 | Watts, Jr. et al. |
| 6,735,708 | B2 | 5/2004 | Watts, Jr. |
| 6,801,974 | B1 | 10/2004 | Watts, Jr. et al. |

(Continued)

FOREIGN PATENT DOCUMENTS

| EP | 1499070 A2 | 1/2005 |
| WO | 2009002464 A2 | 12/2008 |

OTHER PUBLICATIONS

Zheng et al.; "A Novel Wireless Interconnect Technology Using Impulse Radio for Interchip Communications"; IEEE; 2006.*

(Continued)

*Primary Examiner* — David J Huisman
*Assistant Examiner* — Benjamin Geib
(74) *Attorney, Agent, or Firm* — Garlick & Markison; Bruce E. Garlick; Jessica W. Smith

(57) ABSTRACT

A processing module includes a fetch and decode module, an instruction register, a data register, an execution module, and a millimeter wave (MMW) transceiver section. The fetch and decode module is operable to fetch and decode an instruction of a program and to identify data associated with the instruction. The execution module is operable to execute the instruction upon the data associated with the instruction. The MMW transceiver section is operable to wirelessly receive at least one of the instruction and the data associated with the instruction from memory.

20 Claims, 12 Drawing Sheets

U.S. PATENT DOCUMENTS

| | | |
|---|---|---|
| 6,816,925 B2 | 11/2004 | Watts, Jr. |
| 6,859,874 B2 * | 2/2005 | Kruckemyer ............... 712/233 |
| 6,942,157 B2 * | 9/2005 | Nozawa et al. ............... 235/492 |
| 7,065,326 B2 | 6/2006 | Lovberg |
| 7,082,285 B2 | 7/2006 | Linde |
| 7,149,837 B2 | 12/2006 | Watts, Jr. et al. |
| 7,159,099 B2 | 1/2007 | Lucas |
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1 | 11/2002 | Olsen |
| 2003/0001882 A1 | 1/2003 | Macer et al. |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchiyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Brockmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2008/0244148 A1 | 10/2008 | Nix et al. |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0056132 A1 | 3/2010 | Gallagher |
| 2010/0120447 A1 | 5/2010 | Anderson et al. |
| 2010/0146199 A1 | 6/2010 | Shaeffer |
| 2010/0273468 A1 | 10/2010 | Bienas et al. |
| 2011/0134868 A1 | 6/2011 | Lee et al. |

OTHER PUBLICATIONS

Chang et al; "RF/Wireless Interconnect for Inter- and Intra-chip Communications"; IEEE; 2001.*

Gianesello et al.; "65 nm HR SOI CMOS Technology: emergence of Millimeter-Wave SoC"; IEEE; 2007.*

Bruce K Gale, "RF, Electrical, and Magnetic Microsystems," date unknown, 8 pages.

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

XILINX Inc.: Spartan-3AN FPGA Family Data Sheet, DS557, Jun. 2, 2008, pp. 5.

Haworth, et al.; Public Security Screening for Metallic Objects with Millimetre-Wave Images; Heriot-Watt University; United Kingdom; pp. 1-4, date unknown.

Elsadek, et al.; "A Compact 3-D Microwave Holographic Pointer System Using a Size Reduced Microstrip Planar Array"; Department of Electrical and Computer Engineering; University of California; pp. 1-5, 2001.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4, date unknown.

E3 Wii Controller; Nintendo Wilmote; Technology Limitations; XGaming, Inc.; pp. 1-5, 2005.

* cited by examiner

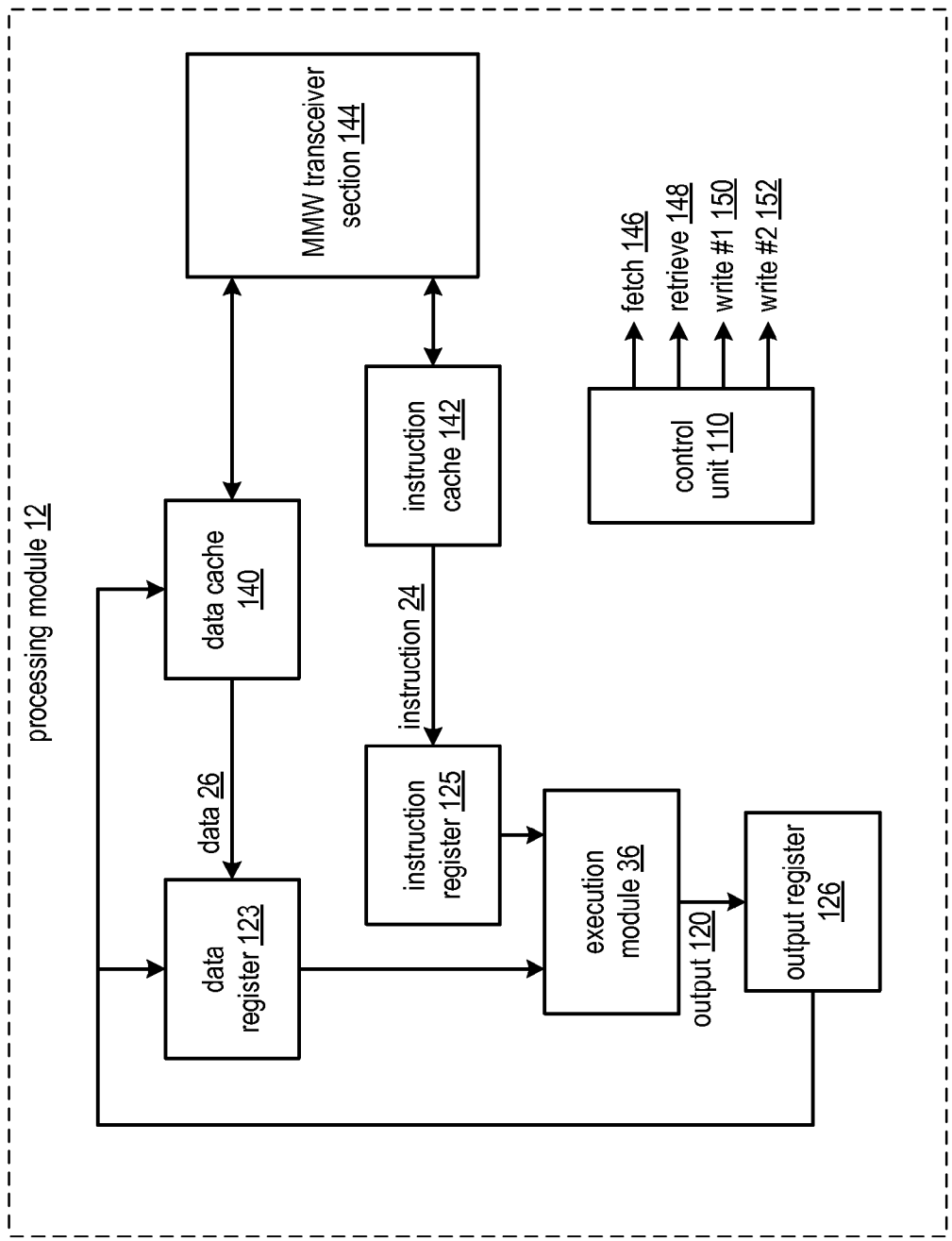

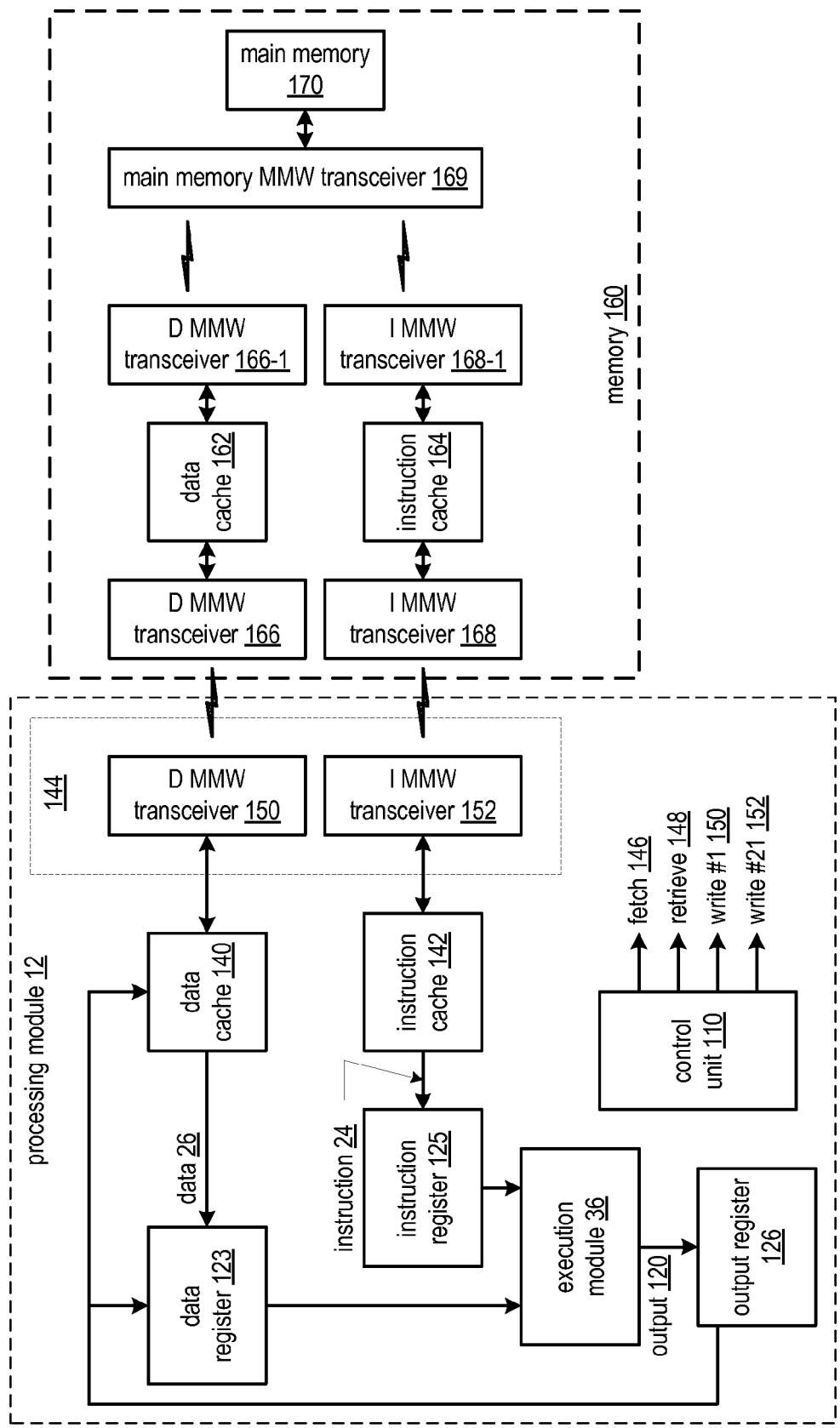

US 8,438,322 B2

PROCESSING MODULE WITH MILLIMETER WAVE TRANSCEIVER INTERCONNECTION

This patent application is claiming priority under 35 USC §120 as a continuation in part patent application of co-pending patent application entitled COMPUTING DEVICE WITH HANDHELD AND EXTENDED COMPUTING UNITS, having a filing date of Feb. 6, 2008, and a Ser. No. 12/026,681 and of patent application entitled RF BUS CONTROLLER, having a filing date of Jan. 31, 2007, and a Ser. No. 11/700,285 (U.S. Pat. No. 8,116,294).

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing devices and more particularly to components of such computing devices.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

As integrated circuit technology advances, the basic architecture of a processing core, memory, and peripheral devices is increasing in complexity, capabilities, and size reduction. However, communication between these components is done using traces (e.g., on an IC and/or on a PCB), which requires drivers to drive the lines. As is known, the transferring of data via the traces and drivers consumes a significant amount of power, which produces heat. With many central processing unit (CPU) architectures, heat dissipation is a critical issue.

Therefore, a need exists for a processing module that reduces power consumption by reducing interconnecting traces and associated driver circuitry.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 11 is a schematic block diagram of another embodiment of a processing module in accordance with the present invention; and FIG. 12 is a schematic block diagram of another embodiment of a processing module in accordance with the present invention.

DETAILED DESCRIPTION OF THE INVENTION

Figure 1:
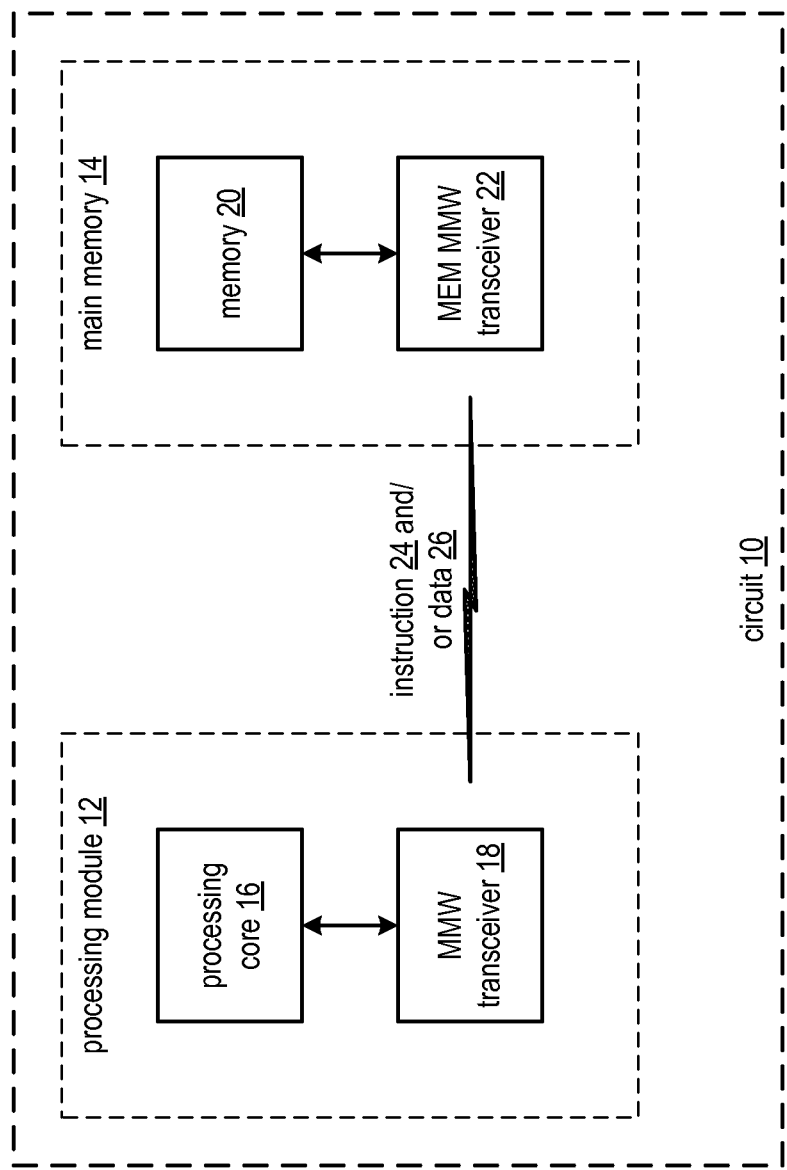
FIG. 1 is a schematic block diagram of an embodiment of an integrated circuit in accordance with the present invention.

FIG. 1 is a schematic block diagram of an embodiment of a circuit 10 that includes a processing module 12 and main memory 14. The circuit 10 may be implemented as single integrated circuit (IC) including the processing module 12 and the main memory 14. Alternatively, the circuit may be implemented as two ICs: one for the processing module 12 and another for the main memory 14.

The processing module 12 includes a processing core 16 and a millimeter wave (MMW) transceiver 18. The processing core 16 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The main memory 14 includes memory 20 and a memory (MEM) MMW transceiver 22. The memory 20 may be a single memory device or a plurality of memory devices. Such a memory device may be a read-only memory, random access memory, volatile memory, non-volatile memory, static memory, dynamic memory, flash memory, cache memory, and/or any device that temporarily or permanently stores digital data.

Each of the transceivers 18 and 22 include a baseband processing module, a receiver section, and a transmitter section. The transmitter and receiver sections may share one or more antennas or each may have its own one or more antennas. The baseband processing module converts outbound data (e.g., an instruction 26 and/or data 28) into an outbound symbol stream in accordance with a data modulation scheme and a channel usage scheme. The data modulation scheme may be binary phase shift keying (BPSK), quadrature phase shift keying (QPSK), frequency shift keying (FSK), minimum shift keying (MSK), amplitude shift keying (ASK), quadrature amplitude modulation (QAM), a combination thereof, and/or variations thereof. The channel usage scheme may be time division multiple access (TDMA), frequency divisional multiple access (FDMA), code division multiple access (CDMA), orthogonal frequency division multiplexing (OFDM), a combination thereof, and/or variations thereof. In addition, the baseband processing module may also utilize a scrambling scheme, an encoding scheme, a data puncture scheme, an interleaving scheme, space-time-frequency encoding, a beamforming scheme, a frequency to time domain conversion, and/or a combination thereof to produce the outbound symbol stream.

The transmitter section converts the outbound symbol stream into an outbound RF signal that has a carrier frequency within a given frequency band (e.g., 57-66 GHz, etc.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $+/-\Delta A$ [amplitude shift] and/or $A(t)$ [amplitude modulation) that adjusts the amplitude of the oscillation to produce the outbound RF signal.

The receiver section amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/-\Delta\theta$ [phase shift] and/or $\theta(t)$ [phase modulation]) and/or frequency information (e.g., $+/-\Delta f$ [frequency shift] and/or $f(t)$ [frequency modulation]). In another embodiment and/or in furtherance of the preceding embodiment, the inbound RF signal includes amplitude information (e.g., $+/-\Delta A$ [amplitude shift] and/or $A(t)$ [amplitude modulation]). To recover the amplitude information, the receiver section includes an amplitude detector such as an envelope detector, a low pass filter, etc.

The baseband processing module converts the inbound symbol stream into inbound data (e.g., the instruction 24 and/or data 26) in accordance with the data modulation scheme and the channel usage scheme. In addition to demodulating the inbound symbol stream, the baseband processing module may also utilize a descrambling scheme, an decoding scheme, a data de-puncture scheme, a de-interleaving scheme, space-time-frequency decoding, a time to frequency domain conversion, and/or a combination thereof to produce the inbound data.

In operation, the processing core 16 and the memory 20 exchange an instruction 26 and/or data 28 via the MMW transceivers 18 and 22. The instruction 24 may be one of a plurality of operation codes, one or a plurality of assembly language codes, one of a software instruction set, one of a plurality of machine codes, etc. Each instruction 24 may have one or more operands (e.g., data 26) associated therewith, which may be representative of data being manipulated in accordance with the instruction (e.g., write XX to an address of memory), a register vale, a value in a stack, an input/output port, or other piece of information.

As an example, assume that the processing core 16 is executing an algorithm that includes a plurality of instructions 24 and data 26 stored in memory 20. To retrieve an instruction 24 and/or data 26 from the memory 20, the processing core 20 executes a fetch instruction, which identifies the instructions 24 and/or data 26 to be retrieved. The PM MMW transceiver 18 converts the fetch instruction into an outbound RF signal that is received as an inbound RF signal by the MEM MMW transceiver 22. The MEM MMW transceiver 22 converts the inbound RF signal into inbound data (e.g., the fetch instruction), which is provided to the memory 20. The memory retrieves the requested instructions 24 and/or data 26 and provides it to the MEM MMW transceiver 22.

The MEM MMW transceiver 22 converts the retrieved instructions 26 and/or data 28 into an outbound RF signal, which is received as an inbound RF signal by the PM MMW transceiver 18. The PM MMW transceiver 18 converts the inbound RF signal into inbound data (e.g., the retrieved instructions 24 and/or data 26) and provides it to the processing core 16. In this manner, instructions 24 and/or data 26 are exchanged via an RF bus structure, which has a carrier frequency in the millimeter wave (MMW) range of 3 GHz to 300 GHz). For a more detailed discussion on an RF bus structure refer to co-pending patent application entitled RF BUS CONTROLLER, having a filing date of Jan. 31, 2007, and a Ser. No. 11/700,285 (U.S. Pat. No. 8,116,294).

As an alternative to RF based transceivers, the transceivers 18 and 22 may be magnetic based. For a discussion of magnetic based transceivers refer to co-pending patent application entitled INDUCTIVELY COUPLED INTEGRATED CIRCUIT AND METHODS FOR USE THEREWITH, having a filing date of Feb. 27, 2008, and a Ser. No. 12/038,260 (U.S. Pat. No. 7,750,435).

Figure 2:
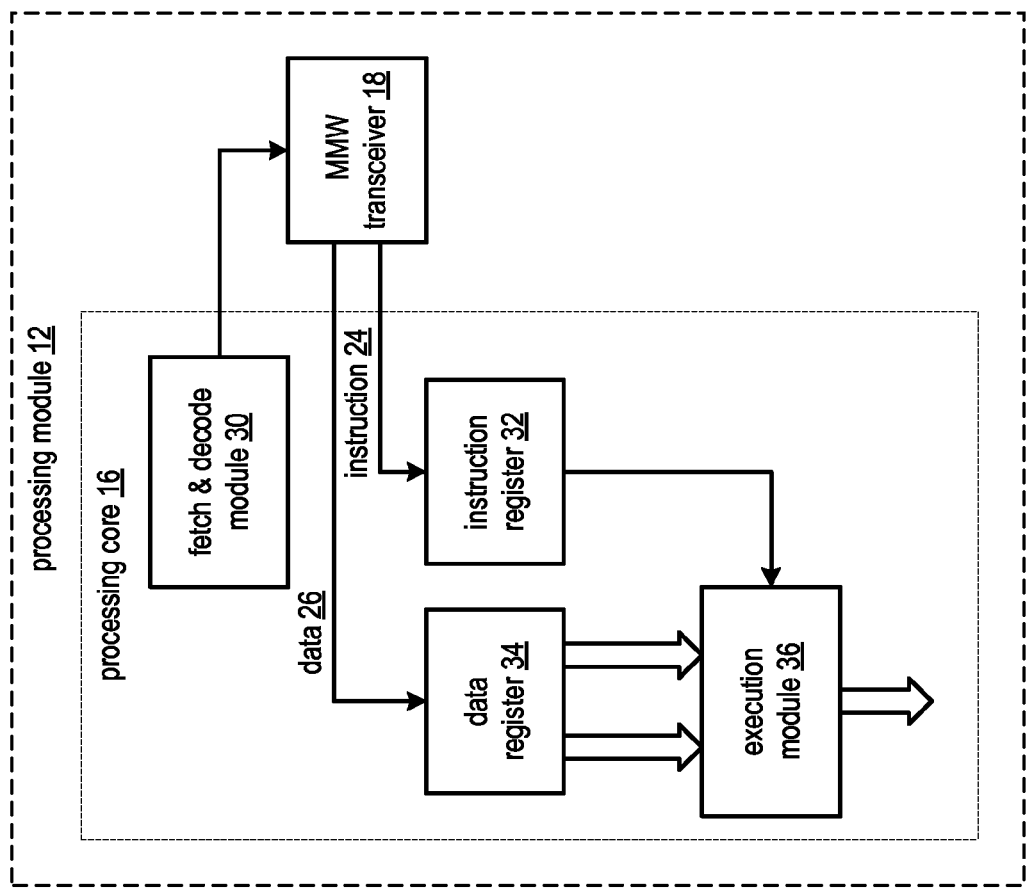
FIG. 2 is a schematic block diagram of an embodiment of a processing module in accordance with the present invention.

FIG. 2 is a schematic block diagram of an embodiment of a processing module 12 that includes the processing core 16 and the MMW transceiver 18. The processing core 16 includes a fetch & decode module 30, an instruction register module 32, a data register module 34, and an execution module 36. The processing core 16 may use any one of a plurality of instruction sets including, but not limited to CISC (complex instruction set computer), RISC (reduced instruction set computer), VLIW (very long instruction word), etc.

Within the processing core 16, the fetch and decode module 30 fetches an instruction 24 from memory 20. This may be done by providing a fetch command to the MMW transceiver 18, which converts it into an outbound RF signal, and transmits it to the memory MMW transceiver 22. In response, the memory MMW transceiver 22 transmits an outbound RF signal that includes the instruction 24 and may include a plurality of instructions. The outbound RF signal from the memory MMW transceiver 22 may be transmitted in one frame (or packet) or in a plurality of frames (or packets). In either case, the MMW transceiver 18 recovers the instruction 24 and provides it to the instruction register 32 and/or provides the instruction 24 to the fetch and decode module 30.

The fetch and decode module 30 decodes the instruction 24 to determine the type of instruction, its input and output registers (if applicable), and the associated data 26. Note that the decoded instruction may be stored in the instruction register module 32, which may include one or more registers and may further include a local instruction cache. Once the data 26 is identified, the fetch and decode module 30 issues a retrieve data command that is provided to the MMW transceiver 18.

The MMW transceiver 18 converts the retrieve data command into an outbound RF signal and transmits it to the memory MMW transceiver 22. The memory MMW transceiver 22 recovers the retrieve data command and sends it to the memory 20, which retrieves the requested data 26 and may further retrieve additional potentially related data. The memory MMW transceiver 22 converts the retrieved data into an outbound RF signal and transmits it to the MMW transceiver 18, which recovers the retrieved data therefrom. The data register module 34 stores the retrieved data.

The execution module 36 executes the instruction 26 upon the data 26 associated with the instruction to produce an output. The execution module 36 may perform an arithmetic function, a logic function, and/or a combination thereof to produce the output. The output may be fed back to the data register 34 for further processing or may be sent to the memory 20.

Figure 3:
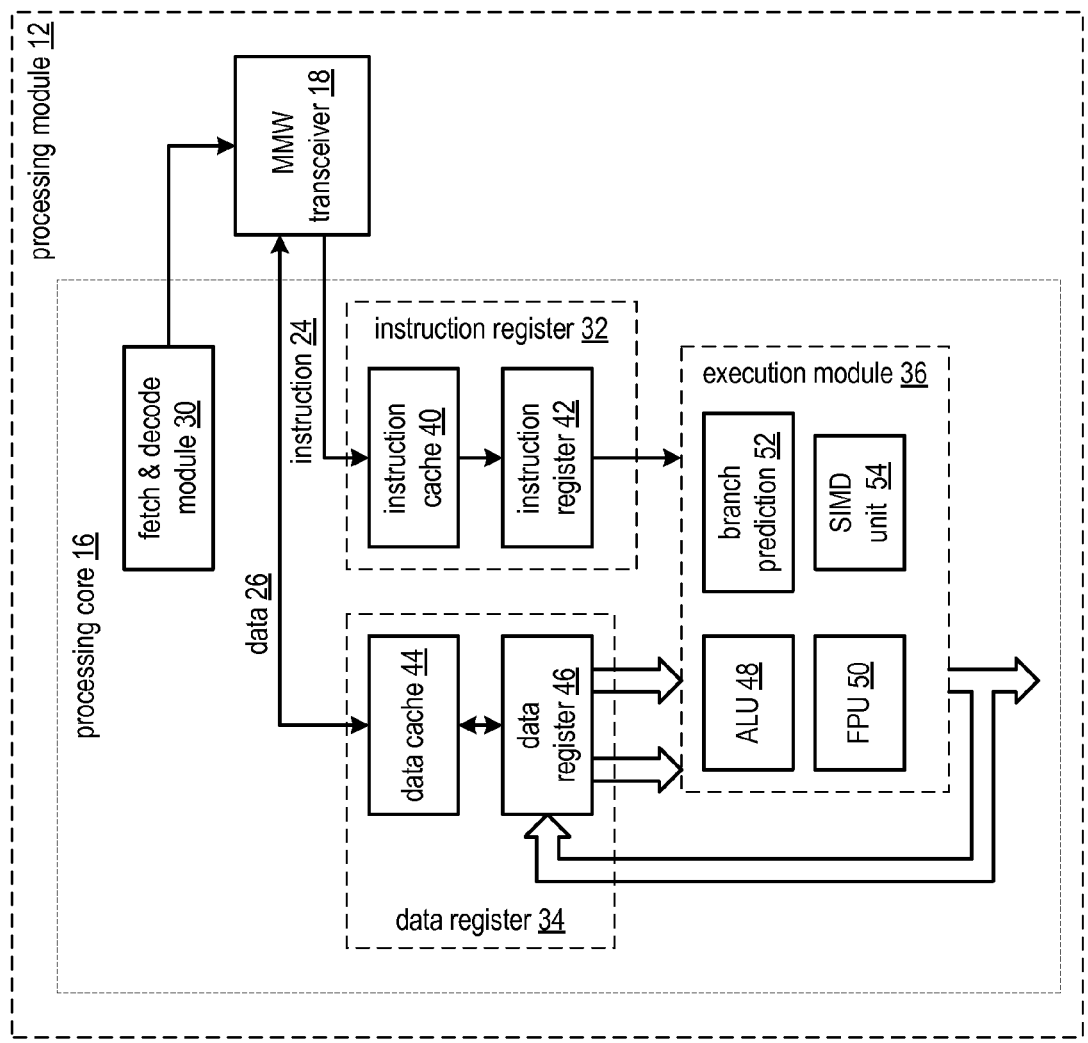
FIG. 3 is a schematic block diagram of another embodiment of a processing module in accordance with the present invention.

FIG. 3 is a schematic block diagram of another embodiment of a processing module 12 that includes the processing core 16 and the MMW transceiver 18. The processing core 16 includes the fetch & decode module 30, the instruction register module 32, the data register module 34, and the execution module 36. The instruction register module 32 may include an instruction cache 40 and/or one or more instruction registers 42. The data register module 34 includes a data cache 44 and/or one or more data registers 46. The execution module 36 may include one or more arithmetic logic units (ALU) 46, one or more floating point units (FPU) 50, one or more branch prediction modules 52, and/or one or more single instruction multiple data (SIMD) units 54.

In this embodiment, a plurality of instructions may be retrieved via the MMW transceiver 18 from memory 20 and stored in the instruction cache 40. As an instruction is needed, it is pulled into the instruction register 42 from the instruction cache 40. Similarly, a plurality of data elements may be retrieved via the MMW transceiver 18 from memory 20 and stored in the data cache 44. When data is needed, it is pulled into the data register 46 from the data cache 44. Note that the size of the instruction cache 40 and data cache 44 may be of any desired size (e.g., 512 kilo-bytes, 1024 giga-bytes, etc.).

Depending on the instruction 24, the execution module 36 may utilize the ALU 48, the FPU 50, the branch prediction module 52, and/or the SIMD unit 54 to produce an output. The output may be provided to the data register 46 and/or to the data cache 44 for further processing or for transmission to the memory 20 for storage.

Figure 4:
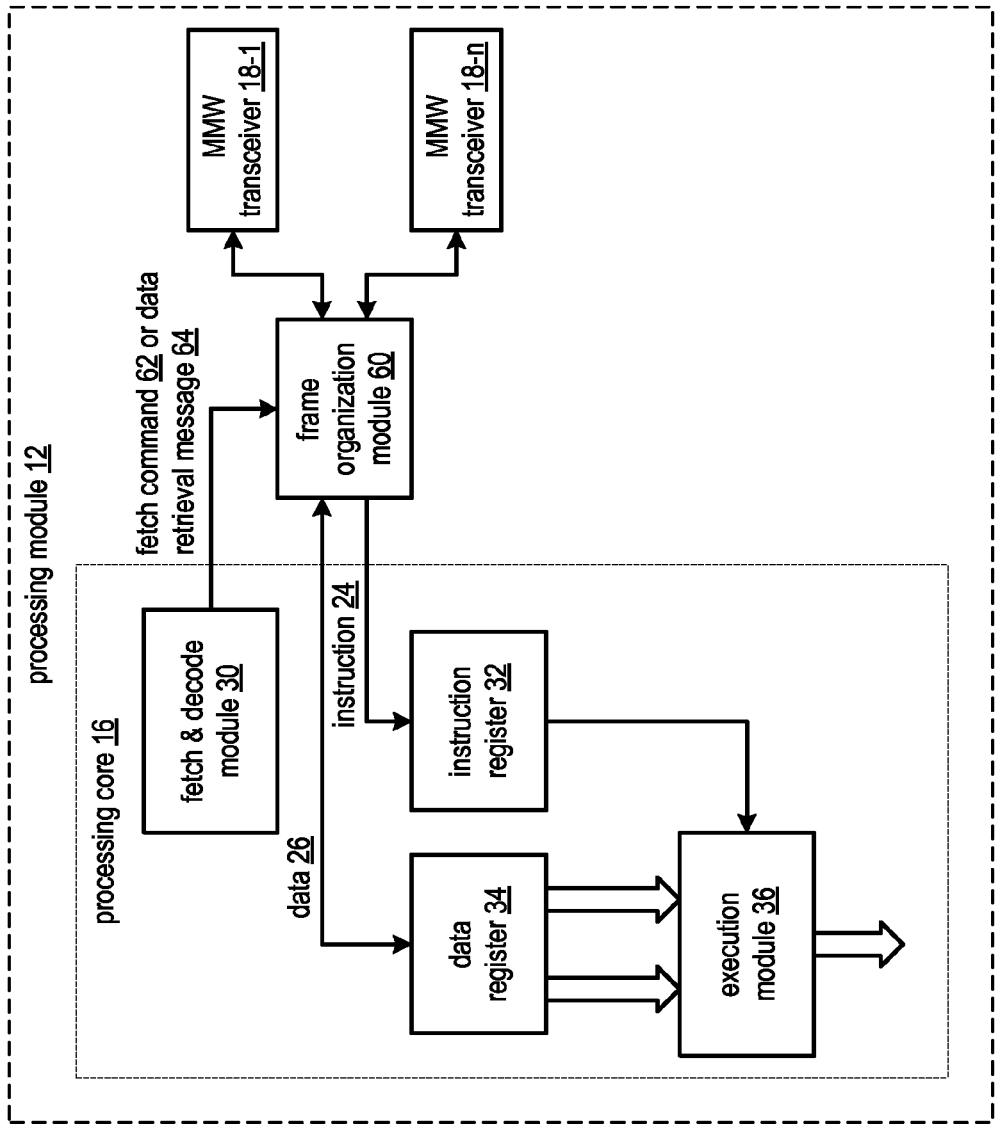
FIG. 4 is a schematic block diagram of another embodiment of a processing module in accordance with the present invention.

FIG. 4 is a schematic block diagram of another embodiment of a processing module 12 that includes the processing core 16, a plurality of MMW transceivers 18-1 through 18-n, and a frame organization module 60. The frame organization module 60 may be a separate circuit from the processing core 16 as shown or may be implemented within the fetch & decode module 30. In either implementation, the frame organization module functions to receive a fetch instruction command 62 from the fetch and decode module 30. In this instance, the fetch and decode module 30 has determined that the instruction 24 is not currently stored in the instruction register module 32 and thus must be retrieved from memory 20.

The frame organization module 60 interprets the fetch command 62 to determine whether just the instruction 24 is being retrieve, whether the instruction 24 plus other related instructions are being retrieved, the size of the instruction 24, the size of the related instructions, the current availability of the MMW transceivers 18-1 through 18-n, other pending retrieval requests, etc. Based on these factors, the frame organization module 60 allocates one or more of the MMW transceivers 18-1 through 18-n to support the retrieval of the instruction and the related instructions, if applicable.

Similarly, the frame organization module 60 receives a data retrieval message 64 from the fetch and decode module 30. The message 64 may indicate that only the data 26 is to be retrieved or whether the data 26 is an element of a plurality of data elements to be retrieved (e.g., a page). The frame organization module 60 interprets the request 64 to determine the amount of data to be conveyed, the current availability of the MMW transceivers 18-1 through 18-n, other pending retrieval requests, etc. Based on these factors, the frame organization module 60 allocates one or more of the MMW transceivers 18-1 through 18-n to support the retrieval of the data and/or the plurality of data elements.

Figure 5:
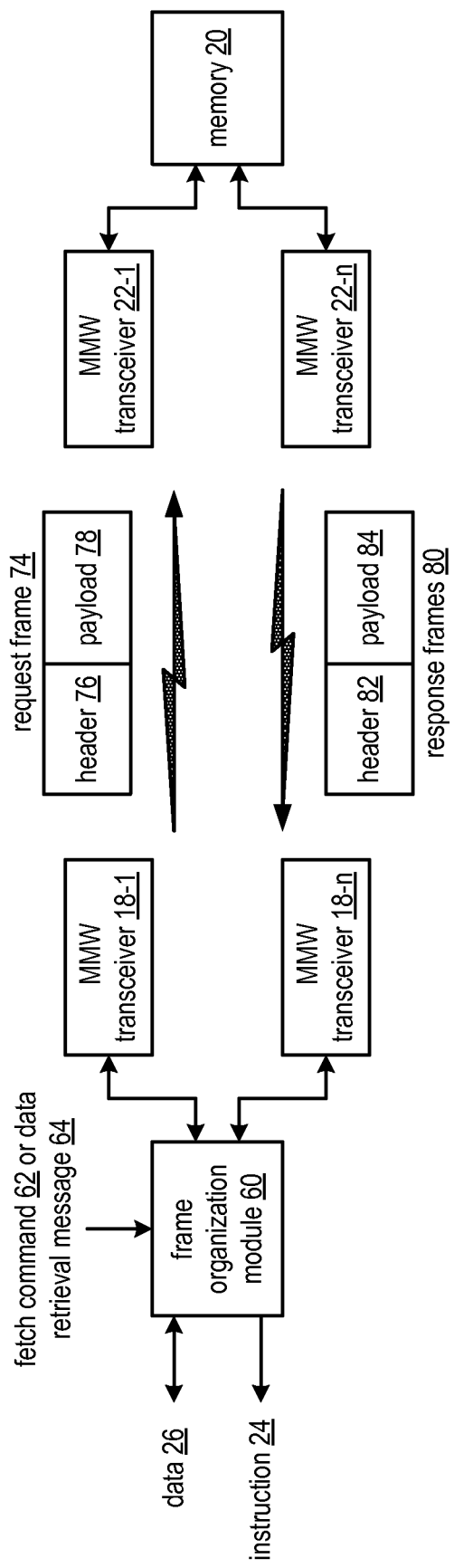
FIG. 5 is an example of an embodiment of a frame organization module coordinating communication with memory in accordance with the present invention.

FIG. 5 is an example of an embodiment of a frame organization module 60 coordinating a communication with memory 20. As mentioned above, the frame organization module 60 may utilize a plurality of factors to determine how to allocate the MMW transceivers 18-1 through 18-n. For instance, the frame organization module 60 may determine that a single MMW transceiver using a single channel (e.g., a channel within a frequency band) may support the conveyance of data or instructions. Alternatively, the frame organization module 60 may determine that a plurality of MMW transceivers using different channels may be needed to support the conveyance of data or the instructions. In general, the frame organization module 60 may determine that the MMW transceivers are to be used in a serial manner, a parallel manner, a serial-parallel manner, in a frequency division multiple access (FDMA) manner, a single channel manner, a multiple channel manner, a time division multiple access (TDMA) manner, a code division multiple access (CDMA) manner, etc.

Once the frame organization module 60 determines the particular set-up for the conveyance of data and/or instructions, it sends a request frame 74 to one or more of the plurality MMW transceivers 22-1 through 22-n associated with memory 20. In an embodiment, one of the MMW transceivers 18 sends to request frame 74 to one of the MMW transceiver 22 of the memory 20 using a default modulation scheme (e.g., BPSK, QPSK, QAM, FSK, MSK, ASK, etc.), a default channel utilization scheme (e.g., spread spectrum, TDMA, OFDM, etc.), and a default channel.

The request frame 74 includes a header section 76 and a payload section 78. The header section 76 may include a training sequence (e.g., a short training sequence and a long training sequence of a WLAN system), signal information (e.g., information regarding the present frame 74, length of the frame, payload size, etc.), etc. The payload section 78 includes the command 62 and/or the message 64, the desired transceiver configuration (e.g., number of transceivers, channels per transceiver, channel assignment to transceivers, etc.), and information regarding the requested instruction and/or data (e.g., address, size, etc.). The default memory MMW transceiver 22 may provide an acknowledgement signal to the MMW transceiver 18 of the processing module 12.

Once the allocation of MMW transceivers and channels have been established, the memory transceivers 18-1 through 18-x (number of transceivers depends on the allocation) generate response frames 80. Each response frame 80 includes a header section 82 and a payload section 84. The header section 82 may include a training sequence, a pilot tone or some other synchronization signaling and information about the frame 80. Such information may include a frame number, it relationship to the other frames (e.g., how this frame relates to the other frames from the memory MMW transceivers), frame size, start of message, end of message, etc. The payload section 84 includes the plurality of data elements, a portion thereof, the instruction and related instructions, a portion thereof, and/or a combination thereof.

Figure 6:
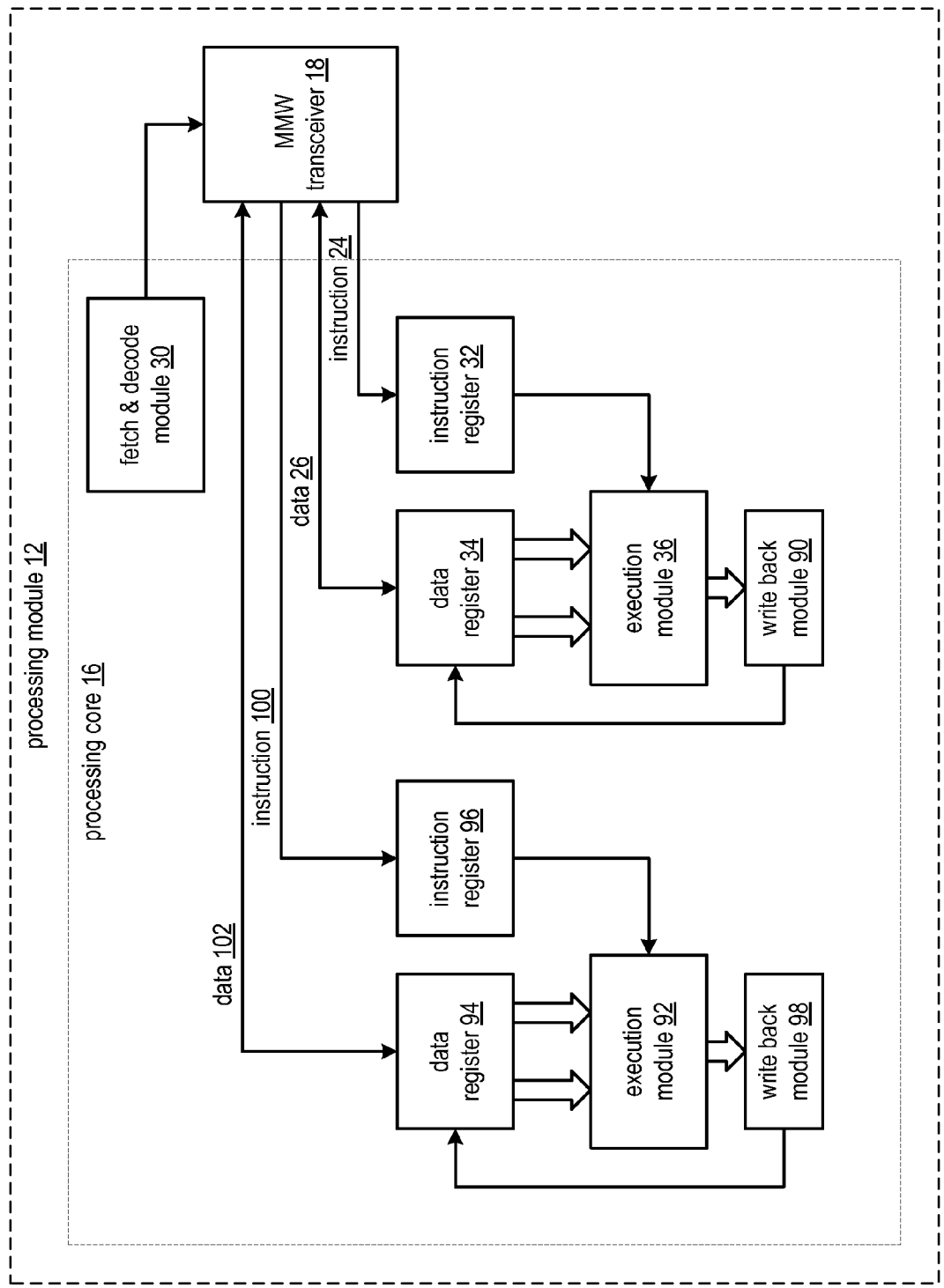
FIG. 6 is a schematic block diagram of another embodiment of a processing module in accordance with the present invention.

FIG. 6 is a schematic block diagram of another embodiment of a processing module 12 that includes the processing core 16 and the MMW transceiver 18. The processing core 16 includes the fetch & decode module 30, the instruction register module 32, the data register module 34, the execution module 36, a write back module 90, a second data register module 94, a second instruction register module 96, a second execution module 92, and a second write back module 98.

In this embodiment, the fetch and decode module 30 fetches and decodes a second instruction 100 and provides it to the second instruction register module 96, which includes an instruction cache and/or one or more registers. In addition, the fetch and decode module 30 identifies second data 102 associated with the second instruction 100 to retrieve from memory 20. The retrieved data 102 is stored in the data register module 94, which includes a data cache and/or one or more registers.

The second execution module 92, which may include one or more of an ALU, FPU, branch prediction unit, and/or a SIMD unit, executes the second instruction 100 upon the data 102 to produce a second output. The write back module 98, which includes cache and/or a register, writes back an output of the execution module 92 to at least one of the data register module 94 and the memory 20. Write back module 90 functions in a similar manner.

In this example embodiment, the first and second instructions 24 & 100 and the first and second data 26 & 102 are retrieved via the MMW transceiver 18 as directed by the fetch & decode module 30. In an alternative embodiment, the processing module 12 may include a second millimeter wave (MMW) transceiver section that wirelessly receives the second instruction 100 and/or the second data 102 from the memory.

Figure 7:
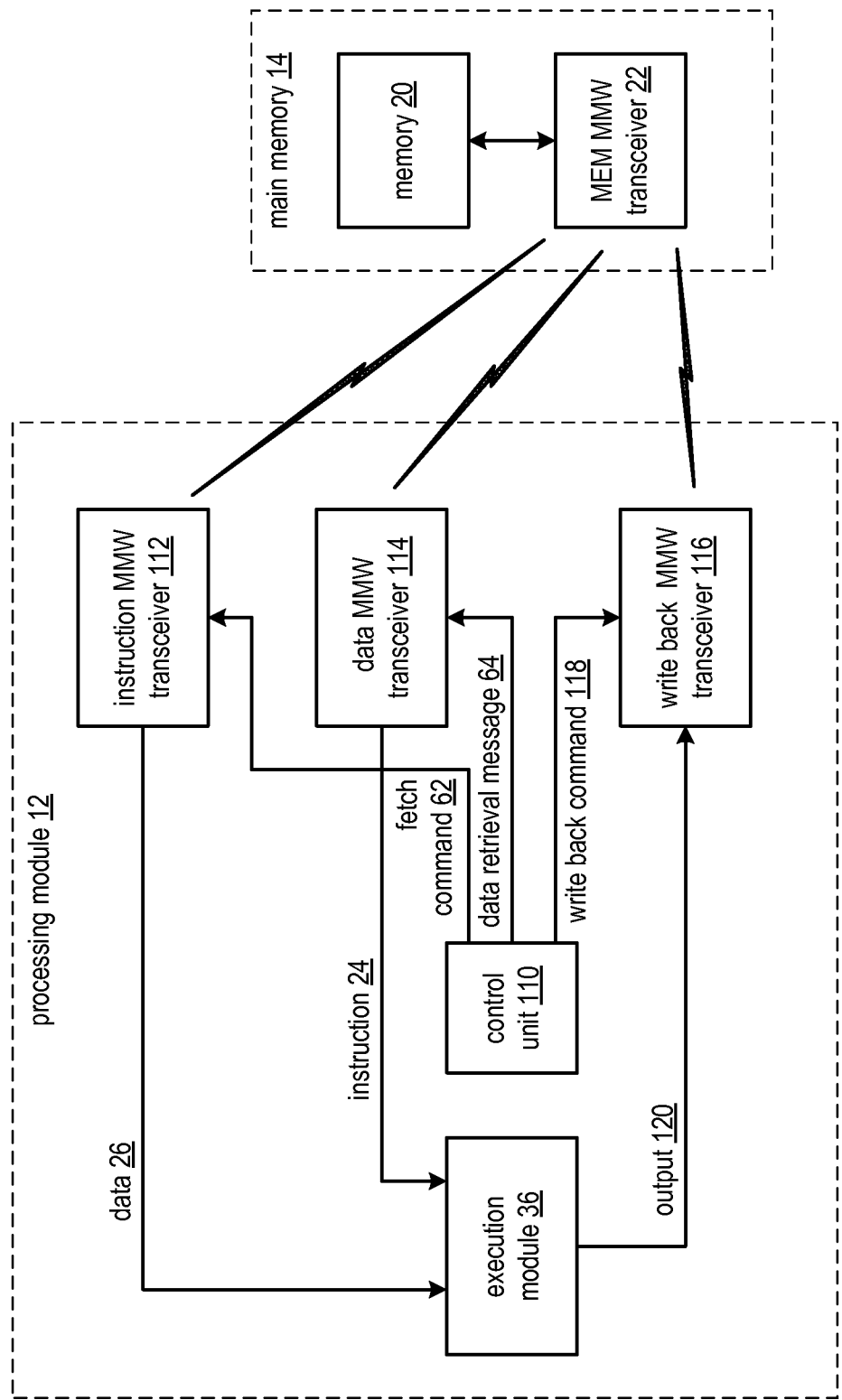
FIG. 7 is a schematic block diagram of another embodiment of a processing module in accordance with the present invention.

FIG. 7 is a schematic block diagram of another embodiment of a processing module 12 that includes the execution module 36, a control unit 110, an instruction MMW transceiver 112, a data MMW transceiver 114, and a write back MMW transceiver 116. As with all of the MMW transceivers mentioned herein, MMW transceivers 112-116 may function in a similar manner as MMW transceiver 18, which was described with reference to FIG. 1. The control unit 110 may be a micro-controller, field programmable gate array, programmable logic device, state machine, logic circuitry, analog circuitry, digital circuitry, and/or any device that manipulates signals (analog and/or digital) based on hard coding of the circuitry and/or operational instructions.

In operation, the control unit 110 generates an instruction fetch command 62 to retrieve the instruction 24 and provides the command to the instruction MMW transceiver 112. The instruction MMW transceiver provides the command 62, as an outbound RF signal, to the memory MMW transceiver 22 and subsequently receives the instruction 24 (and may further include a plurality of instructions), as an inbound RF signal. The instruction MMW transceiver 112 recovers the instruction 24 and provides it to the execution module 36.

The control unit 110 also generates a data retrieval message 64 regarding the data 26 associated with the instruction 24. The control unit 110 provides the message 64 to the data MMW transceiver 114, which converts it into an outbound RF signal that is transmitted to the memory MMW transceiver 22. The memory 20 retrieves the data 26 (as a single data element or as one of a plurality of data elements) in accordance with the message 64. The memory MMW transceiver 22 provides the retrieved data, as an RF signal, to the data MMW transceiver 114, which recovers the data 26 and provides it to the execution module 36.

The execution unit 36 executes the instruction 24 upon the data 26 to produce an output 120. The output 120 may be provided as an input to the execution unit 36 or provided to the write back MMW transceiver 116. If the latter, the control unit 110 generates a write back command 118, which it provides to the write back MMW transceiver 116. The write back MMW transceiver 116 wirelessly transmits the output 120 to the memory 20 in accordance with the write back command 118.

In this embodiment, the control unit 110 coordinates the transceiving of data, instructions, and outputs among the MMW transceivers 112-116 to avoid collisions and to maintain synchronization for the execution unit 36. For example, the control unit 110 may provide the commands 62 & 118 and the message 64 in a time division multiple access manner to avoid collision. Alternatively, each MMW transceiver 112-116 may use a different channel, a different frequency band, etc. to convey the messages and commands to the memory MMW transceiver 22. To synchronize the instruction and data from the execution unit, the fetch command 62 and the data retrieval message 64 may each include a synchronization signal that instructs the MMW transceivers 112-114 to buffer the retrieved instruction and data unit a specific time, until instructed to release, etc.

Figure 8:
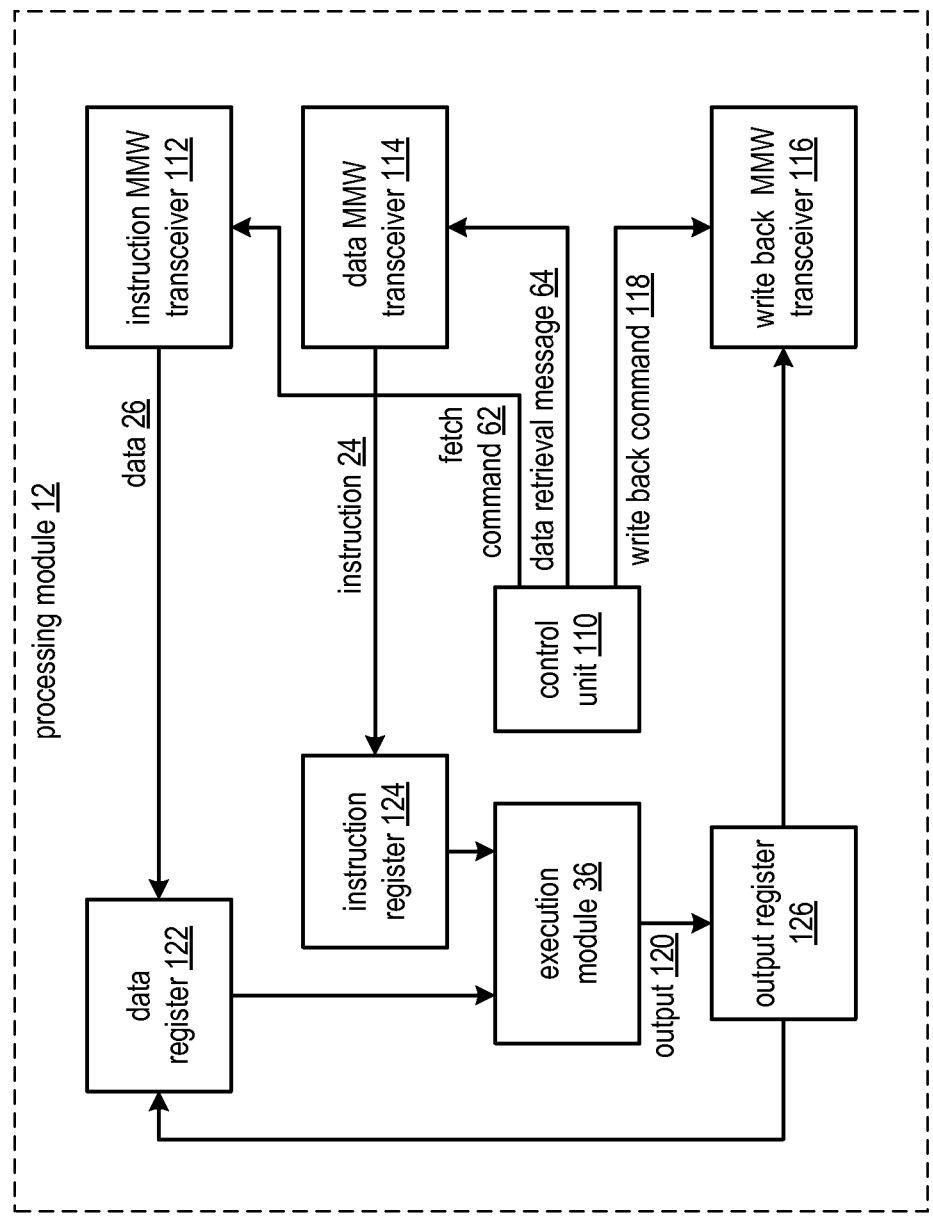
FIG. 8 is a schematic block diagram of another embodiment of a processing module in accordance with the present invention.

FIG. 8 is a schematic block diagram of another embodiment of a processing module 12 that includes the execution module 36, the control unit 110, the instruction MMW transceiver 112, the data MMW transceiver 114, the write back MMW transceiver 116, a data register module 122, an instruction register module 124, and an output register module 126. Each of the register modules 122-126 may include a cache and/or one or more registers.

In this embodiment, the instruction register module temporarily stores one or more instructions. If the instructions stored in the instruction register module 124 do not include instruction 24, the control unit 110 generates the instruction fetch command 62. Similarly, the data register module 1122 temporarily stores one or more data elements. If the data elements do not include data 26, the control unit 110 generates the data retrieval message 64.

The output register module 126 temporarily stores the output 120. The control unit 110 determines whether the output 122 is to be written to the memory 20 or back to the data register module 122. If the output is to be written to memory 20, the control unit 110 generates the write back command 118. Conversely, if the output 120 is to be written to the data register module 122, the control unit 110 generates a second write back command, which causes the output register module 126 to transfer the output 120 to the data register module 122.

Figure 9:
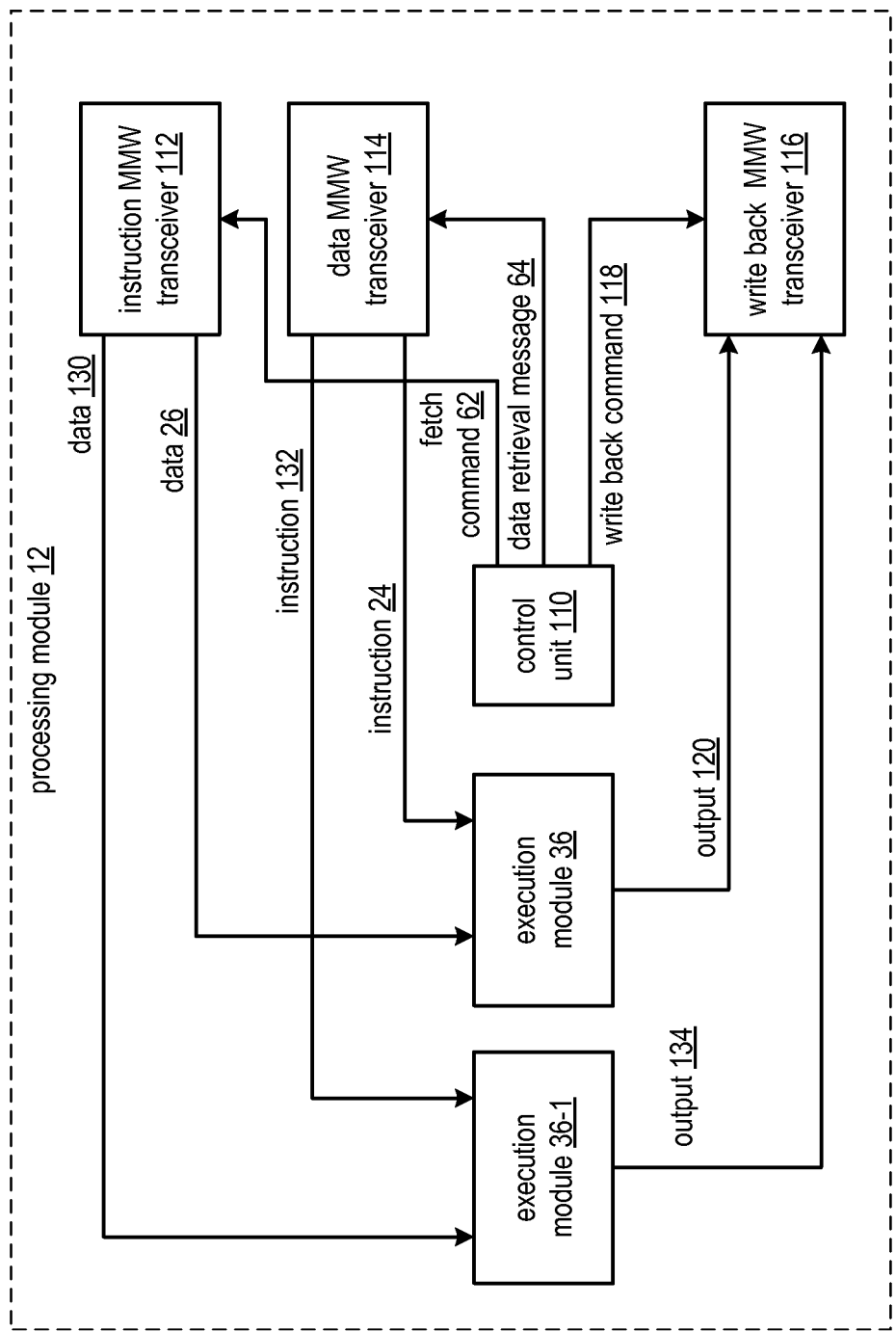
FIG. 9 is a schematic block diagram of another embodiment of a processing module in accordance with the present invention.

FIG. 9 is a schematic block diagram of another embodiment of a processing module 12 that includes the execution module 36, a second execution module 36-1, a control unit 110, an instruction MMW transceiver 112, a data MMW transceiver 114, and a write back MMW transceiver 116. In this embodiment, the control unit 110 generates a second instruction fetch command to retrieve the second instruction 132, generates a second data retrieval message regarding the data 130 associated with the second instruction 132, and determines a second write back command.

The control unit 110 provides the second instruction fetch command to the instruction MMW transceiver 112. The instruction MMW transceiver provides the command, as an outbound RF signal, to the memory MMW transceiver 22 and subsequently receives the instruction 132 (and may further include a plurality of instructions), as an inbound RF signal. The instruction MMW transceiver 112 recovers the instruction 132 and provides it to the second execution module 36-1.

The control unit 110 provides the second data retrieval message to the data MMW transceiver 114, which converts it into an outbound RF signal and transmits it to the memory MMW transceiver 22. The memory 20 retrieves the data 130 (as a single data element or as one of a plurality of data elements) in accordance with the message. The memory MMW transceiver 22 provides the retrieved data, as an RF signal, to the data MMW transceiver 114, which recovers the data 130 and provides it to the second execution module 36-1.

The second execution unit 36-1 executes the instruction 132 upon the data 130 to produce an output 134. The output 134 may be provided as an input to the execution unit 36, as an input to the second execution module 36-1, or provided to the write back MMW transceiver 116. If the latter, the write back MMW transceiver 116 wirelessly transmits the output 134 to the memory 20 in accordance with the second write back command.

Figure 10:
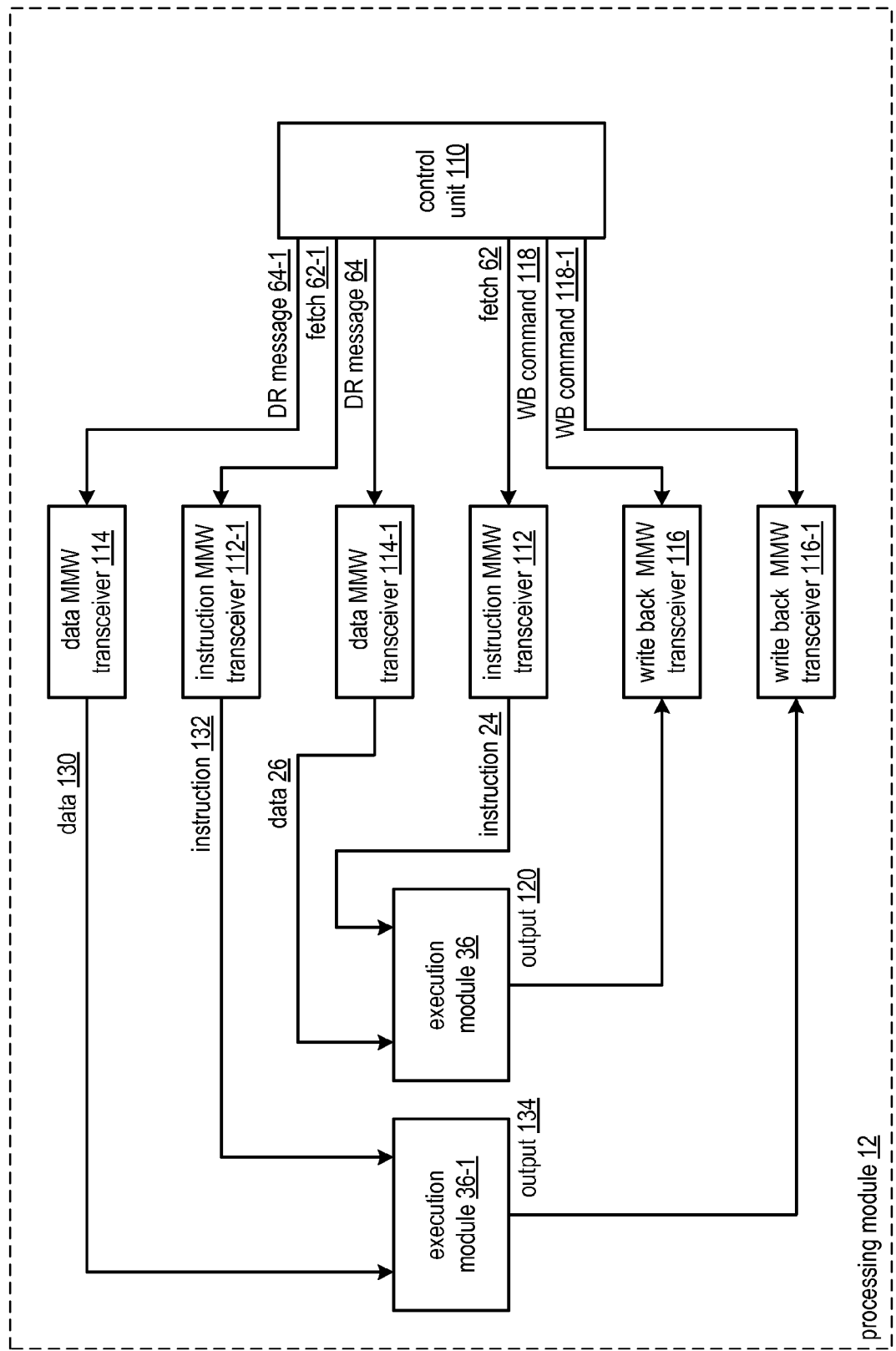
FIG. 10 is a schematic block diagram of another embodiment of a processing module in accordance with the present invention.

FIG. 10 is a schematic block diagram of another embodiment of a processing module 12 that includes the execution module 36, a second execution module 36-1, a control unit 110, an instruction MMW transceiver 112, a data MMW transceiver 114, a write back MMW transceiver 116, a second instruction MMW transceiver 112-1, a second data MMW transceiver 114-1, and a second write back MMW transceiver 116-1. In this embodiment, the control unit 110 generates a second instruction fetch command 62-1 to retrieve the second instruction 132, generates a second data retrieval message 64-1 regarding the data 130 associated with the second instruction 132, and determines a second write back command 118-1.

The control unit 110 provides the second instruction fetch command 62-1 to the second instruction MMW transceiver 112-1. The second instruction MMW transceiver 112-1 provides the command 62-1, as an outbound RF signal, to the memory MMW transceiver 22 and subsequently receives the instruction 132 (and may further include a plurality of instructions), as an inbound RF signal. The second instruction MMW transceiver 112-1 recovers the instruction 132 and provides it to the second execution module 36-1.

The control unit 110 provides the second data retrieval message 64-1 to the second data MMW transceiver 114-1, which converts it into an outbound RF signal and transmits it to the memory MMW transceiver 22. The memory 20 retrieves the data 130 (as a single data element or as one of a plurality of data elements) in accordance with the message. The memory MMW transceiver 22 provides the retrieved data, as an RF signal, to the second data MMW transceiver 114-1, which recovers the data 130 and provides it to the second execution module 36-1.

The second execution unit 36-1 executes the instruction 132 upon the data 130 to produce an output 134. The output 134 may be provided as an input to the execution unit 36, as an input to the second execution module 36-1, or provided to the write back MMW transceiver 116. If the latter, the second write back MMW transceiver 116-1 wirelessly transmits the output 134 to the memory 20 in accordance with the second write back command 118-1.

FIG. 11 is a schematic block diagram of another embodiment of a processing module 12 that includes the execution unit 36, the control unit 110, the data register 123, an instruction register 125, an output register module 126, a data cache 140, an instruction cache 142, and a MMW transceiver section 144. The MMW transceiver section 144 may include a MMW transceiver or a plurality of MMW transceivers (e.g., one for instructions and another for data).

In this embodiment, the control unit 110 generates an instruction fetch command 146 to retrieve the instruction 24 when a plurality of instructions stored in the instruction cache 142 does not include the instruction 24. In response to the fetch command, 146, the MMW transceiver 144 wirelessly retrieves the instruction (and other related instructions) from the memory 20. The retrieved instruction 24 (and the other related instructions) is stored in the instruction cache 142.

The control unit 110 also generates a data retrieval message 148 regarding the data 26 when a plurality of data elements stored in the data cache 140 does not include the data 26. The control unit 110 provides the retrieval message 148 to the MMW transceiver section 144, which wirelessly transmits the retrieval message 148 to the memory 20. The MMW transceiver section 144 receives the retrieved data 26 (and other data elements) and provides the data to the data cache 140 for storage.

With respect to the output 120 produced by the execution unit 36, the control unit 110 generates a first or a second write back command 150 or 152. The control unit 110 generates the first write back command 150 when the output 120 is to written to the data cache 140 and generates the second write back command 152 when the output is to be written to memory 20. In the latter case, the MMW transceiver section 144 wirelessly conveys the output 120 to the memory 20.

In this embodiment, the processing module 12 includes L1 data and instruction caches that are wired to the corresponding components of the processing module 12. The MMW transceiver section 144 provides a wireless link to L2 data and/or instruction caches and/or to main memory.

FIG. 12 is a schematic block diagram of another embodiment of a processing module 12 that includes the execution unit 36, the control unit 110, the data register 123, an instruction register 125, an output register module 126, a data cache 140, an instruction cache 142, and a MMW transceiver section 144. The MMW transceiver section 144 may include a MMW transceiver or a plurality of MMW transceivers (e.g., one for instructions 152 and another for data 150). In this embodiment, the processing module 12 functions substantially as discussed with reference to FIG. 11.

The memory 160 includes a data MMW transceiver 166, an instruction MMW transceiver 168, a data cache 162, an instruction cache 164, a second data MMW transceiver 166-1, a second instruction MMW transceiver 168-1, a main memory MMW transceiver 169, and main memory 170. In this embodiment, the instruction MMW transceiver 168 of the memory 160 and the MMW transceiver 152 of the processing module 12 provide a wireless link between the instruction cache (e.g., L1 instruction cache) of the processing module with the instruction cache (e.g., L2 instruction cache) of the memory 170. Similarly, the data MMW transceiver 166 of the memory 160 and the data MMW transceiver 150 of the processing module 12 provide a wireless link between the data cache 140 (e.g., L1 data cache) and the data cache 162 (e.g., L2 data cache) of the memory 160.

In addition, the main memory MMW transceiver 169 and the data MMW transceiver 166-1 provide a wireless link between the data cache 162 and the main memory 170. Similarly, the main memory MMW transceiver 169 and the instruction MMW transceiver 168-1 provide a wireless link between the main memory 170 and the instruction cache 164.

In an embodiment, the processing module 12 includes an integrated circuit that supports the execution unit 36, the data register 122, the output register 126, the data cache 140, the instruction register 124, the instruction cache 142, the control unit 110, the instruction MMW transceiver 152, the data MMW transceiver 150, the second instruction cache 164, the second instruction MMW transceiver 168, the second data cache 162, and the second data MMW transceiver 166.

In another embodiment, the processing module includes a first and a second integrated circuit. The first integrated circuit supports the execution unit 36, the data register 122, the output register 126, the data cache 140, the instruction register 124, the instruction cache 142, the control unit 110, the instruction MMW transceiver 152, and the data MMW transceiver 150. The second integrated circuit supports the second instruction cache 164, the second instruction MMW transceiver 168, the second data cache 162, and the second data MMW transceiver 166.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A processing module comprising:
    a fetch and decode module operable to fetch and decode an instruction of a program and to identify data associated with the instruction;
    an instruction register module operable to store the instruction;
    a data register module operable to store the data associated with the instruction;
    an execution module operable to execute the instruction upon the data associated with the instruction; and
    a millimeter wave (MMW) transceiver section operable to wirelessly receive at least one of the instruction and the data associated with the instruction from memory, wherein the MMW transceiver section comprises:
        a plurality of MMW transceivers;
        a frame organization module coupled to the plurality of MMW transceivers,
        wherein the frame organization module functions to:
            receive a fetch instruction command from the fetch and decode module;
            receive a data retrieval message from the fetch and decode module;
            allocate at least some of the plurality of MMW transceivers for retrieving the instruction in accordance with the fetch instruction command and for retrieving the data associated with the instruction in accordance with the data retrieval message;
determine at least one channel of a plurality of channels for wirelessly retrieving the instruction; and
determine at least one other channel of the plurality of channels for wirelessly retrieving the data associated with the instruction.

2. The processing module of claim 1 further comprising:
the instruction register module including at least one of an instruction cache and an instruction register; and
the data register module including at least one of data cache and a data register.

3. The processing module of claim 1, wherein the execution module comprises at least one of: one or more arithmetic logic units; one or more floating point units; one or more branch prediction units; and one or more single instruction multiple data (SIMD) units.

4. The processing module of claim 1 further comprising:
the fetch and decode module operable to fetch and decode a second instruction and to identify data associated with the second instruction;
a second instruction register module operable to store the second instruction;
a second data register module operable to store the data associated with the second instruction;
a second execution module operable to execute the second instruction upon the data associated with the second instruction; and
a second MMW transceiver section operable to wirelessly receive at least one of the second instruction and the data associated with the second instruction from the memory.

5. The processing module of claim 1 further comprising:
a write back module operable to write back an output of the execution module to at least one of the data register module and the memory.

6. A processing module comprising:
an execution unit operable to execute an instruction upon data associated with the instruction to produce an output;
a control unit operable to:
generate an instruction fetch command to retrieve the instruction;
generate a data retrieval message regarding the data associated with the instruction; and
determine a write back command;
an instruction millimeter wave (MMW) transceiver operable to wirelessly retrieve the instruction from memory in accordance with the instruction fetch command;
a data MMW transceiver operable to wirelessly retrieve the data associated with the instruction from the memory in accordance with the data retrieval message; and
a write back MMW transceiver operable to wirelessly transmit the output to the memory in accordance with the write back command; and
wherein the control unit is further operable to:
determine at least one channel of a plurality of channels for wirelessly retrieving the instruction by the instruction MMW transceiver;
determine at least one other channel of the plurality of channels for wirelessly retrieving the data associated with the instruction by the data MMW transceiver;
determine at least one further channel of the plurality of channels for wirelessly transmitting the output by the write back MMW transceiver.

7. The processing module of claim 6 further comprising:
an instruction register module coupled to the control unit, the execution unit, and the instruction MMW transceiver, wherein the instruction register module temporarily stores one or more instructions, and wherein, when the one or more instructions does not include the instruction, the control unit generates the instruction fetch command.

8. The processing module of claim 6 further comprising:
a data register module coupled to the control unit, the execution unit, and the data MMW transceiver, wherein the data register module temporarily stores one or more data elements, and wherein, when the one or more data elements does not include the data associated with the instruction, the control unit generates the data retrieval message.

9. The processing module of claim 8 further comprising:
an output register module coupled to the control unit, the execution unit, and the write back MMW transceiver, wherein the output register module temporarily stores the output, and wherein, when the control unit determines that the output is to be written to the memory, the control unit generates the write back command and, when the control unit determines that the output is to be written to the data register module, the control unit coordinates the writing of the output into the data register module.

10. The processing module of claim 6 further comprising:
a second execution unit operable to execute a second instruction upon data associated with the second instruction to produce a second output;
the control unit operable to:
generate a second instruction fetch command to retrieve the second instruction;
generate a second data retrieval message regarding the data associated with the second instruction; and
determine a second write back command;
the instruction MMW transceiver operable to wirelessly retrieve the second instruction from the memory in accordance with the second instruction fetch command;
the data MMW transceiver operable to wirelessly retrieve the data associated with the second instruction from the memory in accordance with the second data retrieval message; and
the write back MMW transceiver operable to wirelessly transmit the second output to the memory in accordance with the second write back command.

11. The processing module of claim 6 further comprising:
a second execution unit operable to execute a second instruction upon data associated with the second instruction to produce a second output;
the control unit operable to:
generate a second instruction fetch command to retrieve the second instruction;
generate a second data retrieval message regarding the data associated with the second instruction; and
determine a second write back command;
a second instruction MMW transceiver operable to wirelessly retrieve the second instruction from the memory in accordance with the second instruction fetch command;
a second data MMW transceiver operable to wirelessly retrieve the data associated with the second instruction from the memory in accordance with the second data retrieval message; and
a second write back MMW transceiver operable to wirelessly transmit the second output to the memory in accordance with the second write back command.

12. A processing module comprising:
an execution unit operable to execute an instruction upon data associated with the instruction to produce an output;
a data register for temporarily storing the data associated with the instruction;
an output register for temporarily storing the output;
a data cache for storing a plurality of data elements;
an instruction register for temporarily storing the instruction;
an instruction cache for storing a plurality of instructions;
a millimeter wave (MMW) transceiver section, wherein the MMW transceiver section comprises an instruction MMW transceiver and a data MMW transceiver;
a control unit operable to:
  generate an instruction fetch command to retrieve the instruction when the plurality of instructions does not include the instruction;
  determine at least one channel of a plurality of channels for wirelessly retrieving the instruction by the instruction MMW transceiver;
  generate a data retrieval message regarding the data associated with the instruction when the plurality of data elements does not include the data associated with the instruction;
  determine at least one other channel of the plurality of channels for wirelessly retrieving the data associated with the instruction by the data MMW transceiver;
  determine a first write back command when the output is to written to the data cache; and
  determine a second write back command when the output is to be written to a memory;
wherein the MMW transceiver section is operable to:
  wirelessly convey the instruction from the memory to the instruction cache in accordance with the instruction fetch command;
  wirelessly convey the data associated with the instruction from the memory to the data cache in accordance with the data retrieval message; and
  wirelessly transmit the output to the memory in accordance with the second write back command.

13. The processing module of claim 12, wherein the memory comprises:
a second instruction cache;
a second instruction MMW transceiver coupled to the second instruction cache, wherein the instruction is conveyed between the second instruction cache and the instruction cache via the second instruction MMW transceiver and the instruction MMW transceiver;
a second data cache; and
a second data MMW transceiver coupled to the second data cache, wherein the data associated with the instruction is conveyed between the second data cache and the data cache via the second data MMW transceiver and the data MMW transceiver.

14. The processing module of claim 13, wherein the memory further comprises:
main memory; and
a main memory MMW transceiver coupled to the main memory, wherein the instruction is conveyed between the main memory and the second instruction cache via the main memory MMW transceiver and the second instruction MMW transceiver and wherein the data associated with the instruction is conveyed between the main memory and the second data cache via the main memory MMW transceiver and the second data MMW transceiver.

15. The processing module of claim 13 further comprising:
an integrated circuit that supports the execution unit, the data register, the output register, the data cache, the instruction register, the instruction cache, the control unit, the instruction MMW transceiver, the data MMW transceiver, the second instruction cache, the second instruction MMW transceiver, the second data cache, and the second data MMW transceiver.

16. The processing module of claim 13 further comprising:
a first integrated circuit that supports the execution unit, the data register, the output register, the data cache, the instruction register, the instruction cache, the control unit, the instruction MMW transceiver, and the data MMW transceiver; and
a second integrated circuit that supports the second instruction cache, the second instruction MMW transceiver, the second data cache, and the second data MMW transceiver.

17. The processing module of claim 12 further comprising:
a fetch and decode module operable to fetch and decode a second instruction and to identify data associated with the second instruction;
a second instruction register module operable to store the second instruction;
a second data register module operable to store the data associated with the second instruction;
a second execution module operable to execute the second instruction upon the data associated with the second instruction; and
a second MMW transceiver section operable to wirelessly receive at least one of the second instruction and the data associated with the second instruction from the memory.

18. The processing module of claim 12 further comprising:
a write back module operable to write back an output of the execution module to at least one of the data register module and the memory.

19. The processing module of claim 18 further comprising:
a write back MMW transceiver operable to wirelessly transmit the output of the execution module to the memory in accordance with the second write back command; and
wherein the control unit is further operable to determine at least one further channel of the plurality of channels for wirelessly transmitting the output of the execution module by the write back MMW transceiver.

20. The processing module of claim 12 wherein the instruction MMW transceiver is operable to wirelessly convey the instruction from the memory to the instruction cache in accordance with the instruction fetch command; and
wherein the data MMW transceiver is operable to wirelessly convey the data associated with the instruction from the memory to the data cache in accordance with the data retrieval message.

* * * * *

UNITED STATES PATENT AND TRADEMARK OFFICE
CERTIFICATE OF CORRECTION

| | | |
|---|---|---|
| PATENT NO. | : 8,438,322 B2 | Page 1 of 1 |
| APPLICATION NO. | : 12/202256 | |
| DATED | : May 7, 2013 | |
| INVENTOR(S) | : Rofougaran et al. | |

It is certified that error appears in the above-identified patent and that said Letters Patent is hereby corrected as shown below:

In the Claims

Col. 15, line 30, in claim 12: before "written to the data cache" insert --be--

Signed and Sealed this
Eleventh Day of February, 2014

Michelle K. Lee
*Deputy Director of the United States Patent and Trademark Office*